United States Patent
Das et al.

(10) Patent No.: US 7,633,668 B2
(45) Date of Patent: Dec. 15, 2009

(54) ELECTROCHROMIC MATERIALS AND ELECTROCHROMIC DEVICES USING THE SAME

(75) Inventors: Rupasree Das, Suwon-si (KR); Chang Ho Noh, Suwon-si (KR); So Yeon Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 39 days.

(21) Appl. No.: 12/114,950

(22) Filed: May 5, 2008

(65) Prior Publication Data

US 2009/0128882 A1    May 21, 2009

(30) Foreign Application Priority Data

Nov. 20, 2007    (KR) .................. 10-2007-0118369

(51) Int. Cl.
G02F 1/153    (2006.01)
G02F 1/00    (2006.01)
G02F 1/15    (2006.01)
C09K 9/00    (2006.01)

(52) U.S. Cl. ............... 359/267; 252/583; 359/265
(58) Field of Classification Search ........... 252/583, 252/586; 359/265, 267, 273
See application file for complete search history.

(56) References Cited

U.S. PATENT DOCUMENTS

| 4,110,259 | A * | 8/1978 | Sichel | 252/514 |
| 4,550,982 | A * | 11/1985 | Hirai | 359/274 |
| 7,450,294 | B2 * | 11/2008 | Weidner | 359/275 |
| 7,532,383 | B2 * | 5/2009 | Jang et al. | 359/266 |
| 2009/0097096 | A1 * | 4/2009 | Noh et al. | 359/265 |

* cited by examiner

*Primary Examiner*—David N Spector
(74) *Attorney, Agent, or Firm*—Cantor Colburn LLP (57) ABSTRACT

Disclosed herein are novel red electrochromic materials. Further, disclosed herein are electrochromic devices comprising the red electrochromic materials. The electrochromic devices can find various applications in various electrochromic systems, including electrochromic windows and smart windows, and can realize full-color images.

18 Claims, 4 Drawing Sheets

ELECTROCHROMIC MATERIALS AND ELECTROCHROMIC DEVICES USING THE SAME

This application claims priority to Korean Patent Application No. 10-2007-0118369, filed on Nov. 20, 2007, and all the benefits accruing therefrom under 35 U.S.C. §119, the entire contents of which are incorporated herein by reference.

BACKGROUND

This disclosure relates to novel red electrochromic materials and electrochromic devices using the same. This disclosure also relates to novel electrochromic materials in which fluorene or carbazole groups are bonded to a viologen moiety to produce a red color, and electrochromic devices comprising the electrochromic materials.

Electrochromism is a phenomenon in which the color of a material reversibly changes depending on the direction of an electric field when a voltage is applied to the material. Electrochromic materials refer to materials that exhibit electrochromism and can undergo reversible changes in optical properties by electrochemical redox reactions. That is, some electrochromic materials exhibit their characteristic color when no external electric field is applied and then show different colors in the presence of an electric field. Contrary to this, some other electrochromic materials have particular colors when no external electric field is applied and then their colors disappear in the presence of an electric field.

Electrochromic devices based on electrochromism offer the advantages such as high reflectance without the need for external light sources, flexibility, portability and are lightweight. Based on these advantages, electrochromic devices are expected to have many applications in various flat-panel displays. In particular, electrochromic devices have drawn considerable attention in recent years for their applicability to electronic paper, which is currently being investigated as an electronic medium for replacing traditional paper.

Such electrochromic materials are known to include, for example, inorganic compounds, such as, tungsten oxide and molybdenum oxide; and organic compounds, such as, pyridine compounds, aminoquinone compounds and azine compounds.

In comparison with inorganic electrochromic materials, organic electrochromic materials are disadvantageous in terms of long-term stability. However, organic electrochromic materials have advantages in that they are applicable to flexible substrates and can be used to form thin films by wet processes. Based on these advantages, a great deal of research has been conducted on organic electrochromic materials.

In order to achieve full-color electrochromic devices, a combination of red, green and blue are required. However, few red electrochromic materials are been known to date. Under such circumstances, there exists a strong need in the art to develop red electrochromic materials.

SUMMARY

Accordingly, example embodiments have been made to develop novel red electrochromic materials.

In one embodiment, the invention provides An electrochromic material represented by the compound of Formula 1:

(1)

wherein $R_1$, $R_2$ and $R_3$ are independently hydrogen, halogen, CN, $C_1$-$C_{12}$ alkyl, $C_1$-$C_{12}$ cycloalkyl, $C_1$-$C_{12}$ alkoxy, $C_5$-$C_{12}$ aryl, $C_5$-$C_{12}$ aryloxy, $C_5$-$C_{12}$ heteroaryl, silyl, dialkylboronyl or diarylboronyl, and X represents a counter ion.

In one embodiment, the invention provides an electrochromic material represented by the compound of Formula 2:

(2)

wherein $R_1$, $R_2$, $R_3$ and $R_4$ are independently hydrogen, halogen, CN, $C_1$-$C_{12}$ alkyl, $C_1$-$C_{12}$ cycloalkyl, $C_1$-$C_{12}$ alkoxy, $C_5$-$C_{12}$ aryl, $C_5$-$C_{12}$ aryloxy, $C_5$-$C_{12}$ heteroaryl, silyl, dialkylboronyl or diarylboronyl, and X represents a counter ion.

The invention also provides electrochromic devices comprising the red electrochromic materials represented by the compounds of Formulas 1 and 2.

BRIEF DESCRIPTION OF THE DRAWINGS

The above and other objects, features and advantages of the disclosed embodiments will be more apparent from the following detailed description taken in conjunction with the accompanying drawings in which.

It should be noted that these Figures are intended to illustrate the general characteristics of methods, structure and/or materials utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by exemplary embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE INVENTION

Hereinafter, exemplary embodiments will be described in detail with reference to the accompanying drawings. Reference now should be made to the drawings, in which the same reference numerals are used throughout the different drawings to designate the same or similar components. In the drawings, the thicknesses and widths of layers are exaggerated for clarity. Exemplary embodiments may, however, be embodied in many different forms and should not be construed as limiting the exemplary embodiments set forth herein. Rather, these exemplary embodiments are to provide a thorough and complete disclosure, and to fully convey the scope of exemplary embodiments to those skilled in the art.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers in-between. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship with another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative terms used herein are interpreted accordingly.

The terminology used herein is for the purpose of describing particular embodiments only and is not intended to be limiting of example embodiments. As used herein, the term "and/or" includes any and all combinations of one or more of the associated listed items. As used herein, the singular forms "a," "an" and "the" are intended to include the plural forms as well, unless the context clearly indicates otherwise. The term "or" means "and/or". The terms "comprises", "comprising", "having", "including", and "containing" are to be construed as open-ended terms (i.e., meaning including, but not limited to").

Exemplary embodiments are described herein with reference to cross-sectional illustrations that are schematic illustrations of exemplary embodiments (and intermediate structures). As such, variations from the shapes of the illustrations, for example, of manufacturing techniques and/or tolerances, are to be expected. Thus, example embodiments should not be construed as limiting the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one embodiment, the invention provides a red electrochromic material represented by the compound of Formula 1:

(1)

wherein $R_1$, $R_2$ and $R_3$ are independently hydrogen, halogen, CN, $C_1$-$C_{12}$ alkyl, $C_1$-$C_{12}$ cycloalkyl, $C_1$-$C_{12}$ alkoxy, $C_5$-$C_{12}$ aryl, $C_5$-$C_{12}$ aryloxy, $C_5$-$C_{12}$ heteroaryl, silyl, dialkylboronyl or diarylboronyl, and X represents a counter ion.

In another embodiment, the invention provides a red electrochromic material represented by the compound of Formula 2:

(2)

wherein $R_1$, $R_2$, $R_3$ and $R_4$ are independently hydrogen, halogen, CN, $C_1$-$C_{12}$ alkyl, $C_1$-$C_{12}$ cycloalkyl, $C_1$-$C_{12}$ alkoxy, $C_5$-$C_{12}$ aryl, $C_5$-$C_{12}$ aryloxy, $C_5$-$C_{12}$ heteroaryl, silyl, dialkylboronyl or diarylboronyl, and X represents a counter ion.

Examples of the counter ions in Formula 1 and 2 include, but are not necessarily limited to, halides, $PF_6^{-1}$, $BF_4^-$ and $BH_4^-$.

At least one of $R_1$, $R_2$ and $R_3$ in Formula 1 and at least one of $R_1$, $R_2$, $R_3$ and $R_4$ in Formula 2 may be substituted with a group of the compound of Formula 3:

(3)

wherein -Z- is selected from the group consisting of —$(CH_2)_n$—, wherein n is an integer from 1 to 10, $C_4$-$C_{12}$ cycloalkyl, $C_4$-$C_{12}$ alkenyl, $C_5$-$C_{12}$ aryl, $C_5$-$C_{12}$ heteroaryl and $SiR_2$. In one embodiment, n is 1 or 2.

The group of Formula 3 may be substituted at any position on the carbazole and fluorene rings of the compounds of Formula 1 and 2.

In another embodiment, the compound of Formula 1 may further contain linking groups (-Z-) through which the carbazole groups are bonded to the viologen moiety, as represented by the compound of Formula 4:

(4)

wherein $R_1$, $R_2$ and $R_3$ are as defined in Formula 1, and -Z- is selected from the group consisting of —$(CH_2)_n$—, wherein n is an integer from 1 to 10, $C_4$-$C_{12}$ cycloalkyl, $C_4$-$C_{12}$ alkenyl, $C_5$-$C_{12}$ aryl, $C_5$-$C_{12}$ heteroaryl and $SiR_2$. In one embodiment, n is 1 or 2.

In another embodiment, the compound of Formula 2 may further contain linking groups (-Z-) through which the fluorene groups are bonded to the viologen moiety, as represented by Formula 5:

(5)

wherein $R_1$, $R_2$, $R_3$, $R_4$, X and Z are as defined in Formula 2.

In one embodiment, the compound of Formula 1 can be synthesized by reacting a viologen derivative and a carbazole derivative in methanol. The compound of Formula 2 can be synthesized by reacting a viologen derivative and a fluorene derivative in methanol.

A non-limiting example of the compound of Formula 1 is 1,1-(3-(9-ethyl carbazolyl)-4,4-bipyridinium chloride of the compound of Formula 6:

(6)

In one embodiment, the compound of Formula 6 can be synthesized by reacting 1,1-2,4-nitrophenyl-4,4-bipyridinium chloride and 3-amino-9-ethylcarbazole in methanol, as depicted in Reaction Scheme below:

A non-limiting example of the compound of the compound of Formula 2 is 1,1-(2-fluorenyl)-4,4-bipyridinium chloride of the compound of Formula 7:

(7)

In one embodiment, the compound of Formula 7 can be synthesized by reacting 1,1-2,4-dinitrophenyl-4,4-bipyridinium chloride and 1-aminofluorene in methanol, as depicted in Reaction Scheme below:

In general, viologen derivatives undergo electrical reduction in the presence of an electric field to turn blue, as depicted below:

In contrast, as explained above, the electrochromic materials of exemplary embodiments described herein are prepared by reacting viologen derivatives with a fluorene or carbazole derivative to produce a red color. Accordingly, the electrochromic materials of exemplary embodiments can find various applications in red electrochromic systems, including electrochromic windows and smart windows, and can be used for the fabrication of full-color electrochromic devices.

In one embodiment the invention provides electrochromic devices fabricated using the compound of Formula 1 or 2.

Specifically, exemplary embodiments of the invention provide electrochromic devices comprising a transparent electrode having a transparent substrate and a conductive layer formed on the transparent substrate, an electrochromic material layer formed on the transparent electrode, a counter electrode disposed opposite to the transparent electrode, and an electrolyte layer interposed between the transparent electrode and the counter electrode wherein the electrochromic mate rial layer contains the red electrochromic material represented by the compounds of Formulas 1 and 2.

It will be understood by one of skill in the art that, with the exception of the electrochromic material layer, the electrodes and elements of the electrochromic devices according to example embodiments can be fabricated by any known processes.

Figure 7:
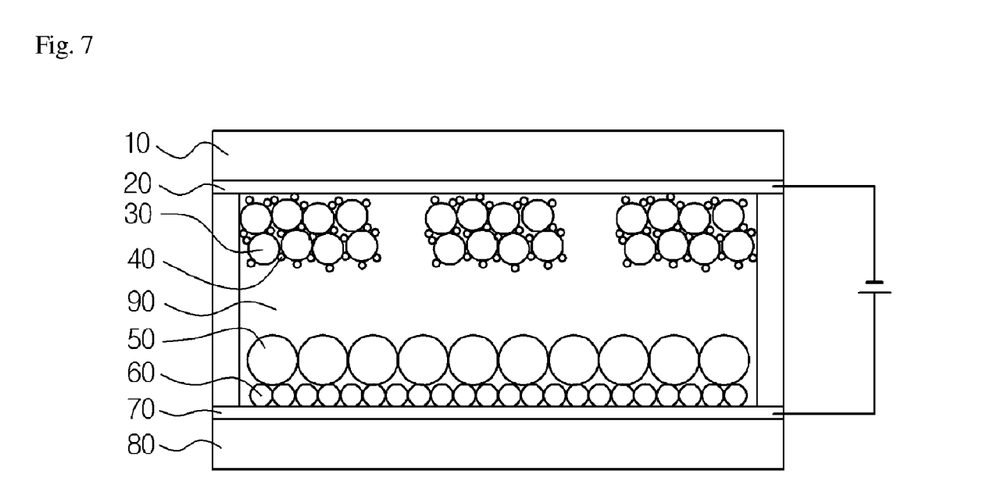
FIG. 7 is a schematic cross-sectional view of an electrochromic device according to an exemplary embodiment.

FIG. 7 is a schematic cross-sectional view of an electrochromic device according to exemplary embodiments.

Referring to FIG. 7, the transparent substrate 10 used in the electrochromic device may be a transparent inorganic substrate, such as, for example, a quartz or glass substrate, or a transparent plastic substrate made of a polymeric material, such as, for example, polyethylene terephthalate (PET), polyethylene naphthalate (PEN), polyethersulfone (PES), polycarbonate, polystyrene or polypropylene. In an exemplary embodiment, a flexible substrate is used.

Any transparent conductive material may be used to form a conductive layer 20 on the transparent substrate 10. Exemplary transparent conductive materials include, for example, indium tin oxide (ITO), fluorine-doped tin oxide (FTO), transparent electrode materials comprising carbon nanotubes (CNTs), and conductive polymers, e.g., polyacetylene and polythiophene.

In one embodiment, the electrochromic material layer can be formed using the red electrochromic material only. In another embodiment, the electrochromic material layer can be formed using the red electrochromic material in combination with at least one electrochromic material selected from the group consisting of metal oxides, such as tungsten oxide and molybdenum oxide, pyridine compounds, aminoquinone compounds and viologens.

In one embodiment, nanostructures 30 of the electrochromic material 40 are used to form the electrochromic material layer. The nanostructures 30 may have various shapes, including spheres, tetrahedrons, cylinders, rods, triangles, discs, tripods, tetrapods, cubes, boxes, stars, tubes, etc.

Any known electrolyte material may be employed as the electrolyte 90. Suitable electrolyte materials include, but are not limited to, solutions of lithium salts, potassium salts and sodium salts in suitable solvents.

There is no particular limitation on the type of materials used for a conductive layer of the counter electrode 70 so long as the materials are electrically conductive. Transparency is not necessarily required for the conductive materials. Further, a counter material layer 60 can be formed on the conductive layer of the counter electrode in terms of efficient electrochemical reactions of the electrochromic material.

The electrochromic devices of exemplary embodiments may further comprise a white reflective layer 50 on the counter electrode 70. The white reflective layer 50 may be formed of a known material. Examples of suitable materials for the white reflective layer include, but are not limited to, $TiO_2$, $BaSO_4$, $Al_2O_3$, ZnO, and MgO.

The present invention will now be described in further detail with reference to the following examples. These examples are for illustrative purposes only and are not intended to limit the scope of the present invention.

EXAMPLES

Example 1

Synthesis of 1,1-(2-fluorenyl)-4,4-bipyridinium chloride

Reaction Scheme 1

Figure 1:
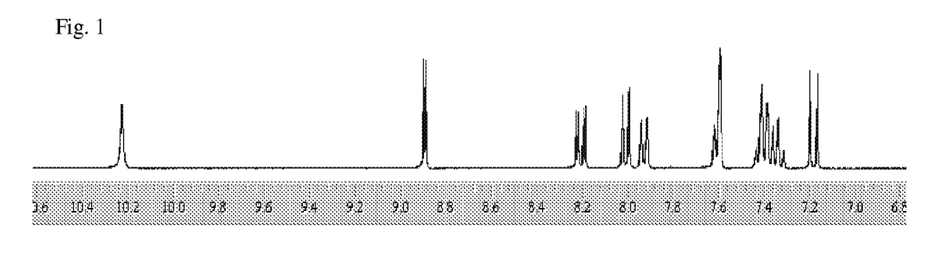
FIG. 1 is a $^1$H NMR spectrum of an electrochromic material prepared in Example 1 according to an exemplary embodiment.
Figure 3:
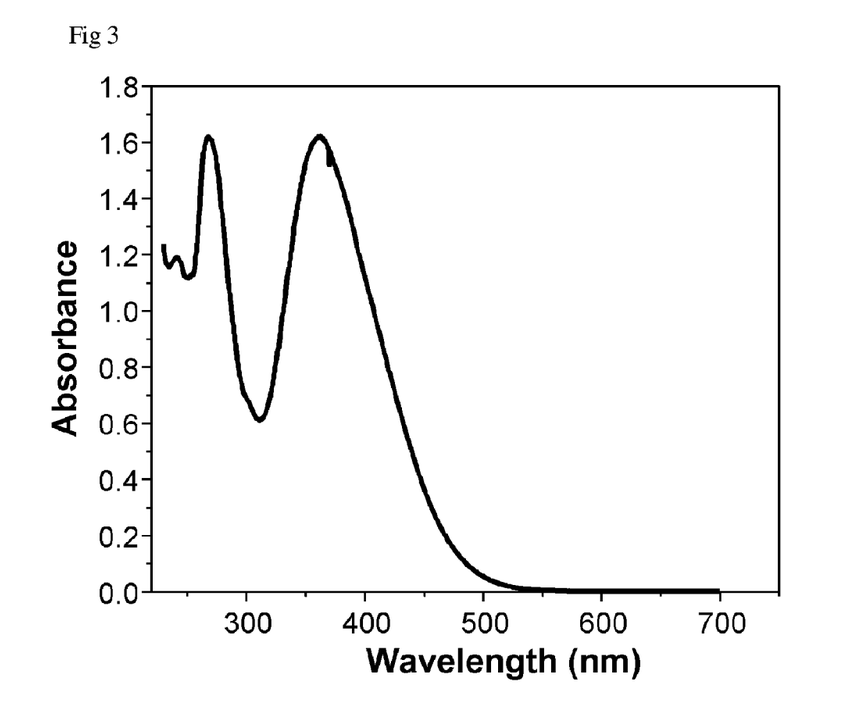
FIG. 3 is an absorption spectrum of an electrochromic material prepared in Example 1 according to an exemplary embodiment.

As depicted in Reaction Scheme 1, 0.56 g (1 mmol) of 1,1-2,4-dinitrophenyl)-4,4-bipyridinium chloride and 0.181 g (1 mmol) of 1-aminofluorene were reacted in 30 mL of methanol for 12 hours. The reaction mixture was evaporated to remove the solvent, washed with 50 mL of distilled water, filtered, and dried to obtain a yellowish brown residue. Then, the residue was dissolved in methanol/chloroform (1:1) and allowed to stand overnight. Subsequently, the solution was filtered and dried to obtain the title compound as a yellow crystal. The structure of the product was identified by $^1$H NMR spectroscopy (FIG. 1). The absorption spectrum of the product in a methanolic solution is shown in FIG. 3.

Example 2

Synthesis of 1,1-(3-(9-ethylcarbazole)-4,4-bipyridinium chloride

Reaction Scheme 2

Figure 2:
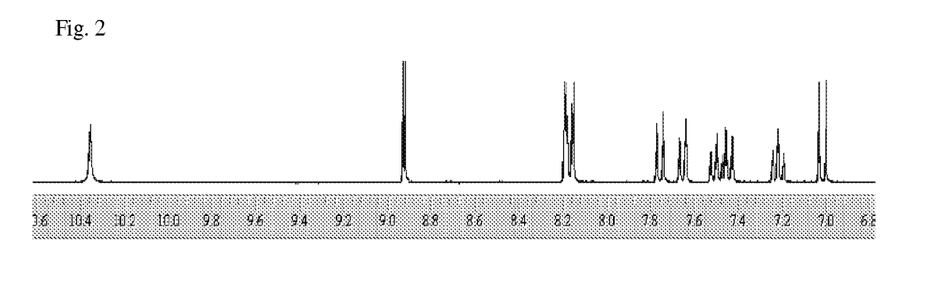
FIG. 2 is a $^1$H NMR spectrum of an electrochromic material prepared in Example 2 according to an exemplary embodiment.
Figure 4:
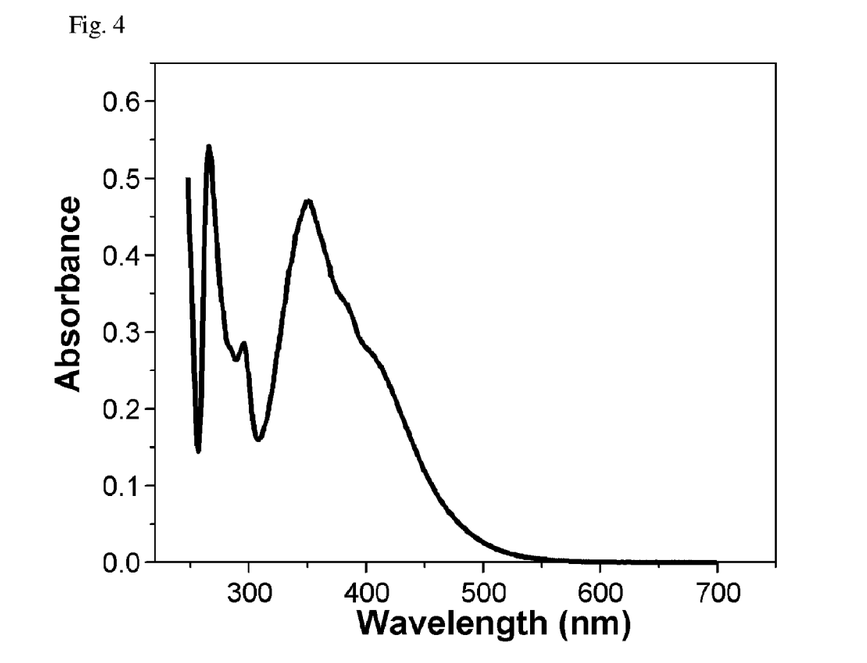
FIG. 4 is an absorption spectrum of an electrochromic material prepared in Example 2 according to an exemplary embodiment.

As depicted in Reaction Scheme 2, 0.56 g (1 mmol) of 1,1-2,4-dinitrophenyl)-4,4-bipyridinium chloride and 0.21 g (1 mmol) of 3-amino-(9-ethylcarbazole) were reacted in 30 mL of methanol for 12 hours. The reaction mixture was evaporated to remove the solvent, washed with 50 mL of distilled water, filtered, and dried to obtain a red residue. Then, the residue was dissolved in methanol/chloroform (1:1) and allowed to stand overnight. Subsequently, the solution was filtered and dried to obtain the title compound as a red crystal. The structure of the product was identified by $^1$H NMR spectroscopy (FIG. 2). The absorption spectrum of the product in a methanolic solution is shown in FIG. 4.

Experimental Examples

Measurement of Electrochromic Properties of Electrochromic Materials

Experimental Examples 1 and 2

Figure 5:
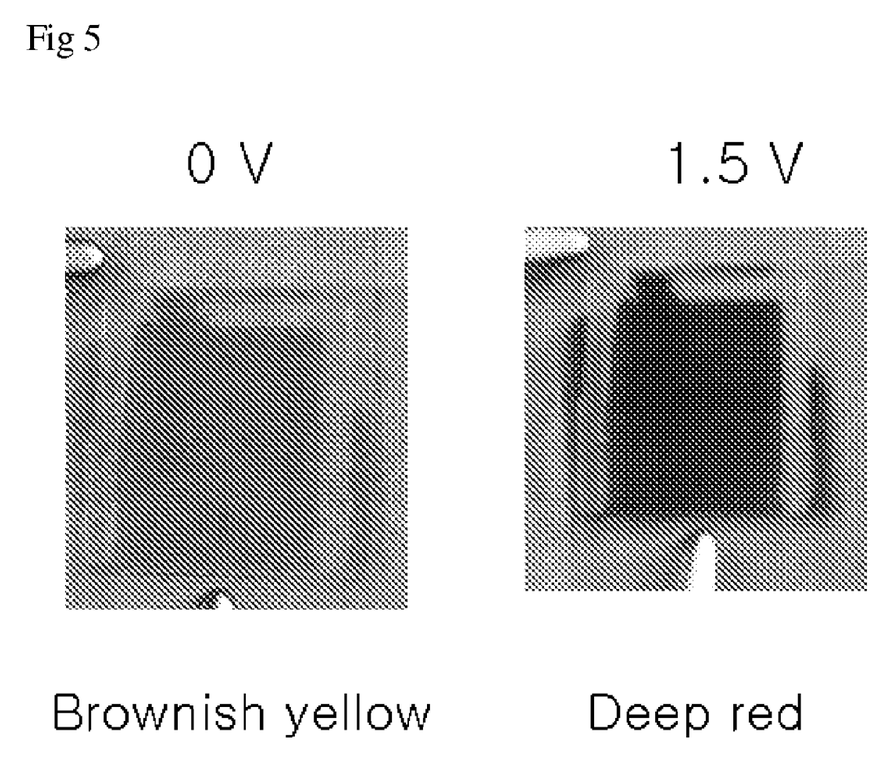
FIG. 5 shows photographs of an electrochromic material prepared in Example 1 according to an exemplary embodiment.
Figure 6:
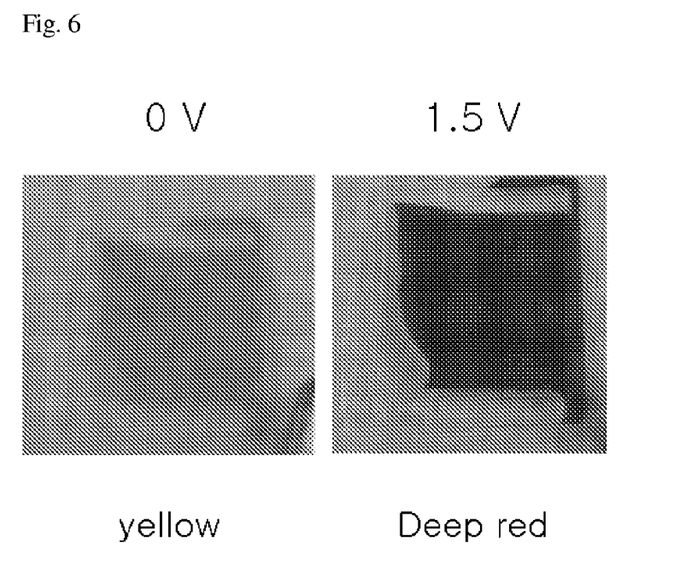
FIG. 6 shows photographs of an electrochromic material prepared in Example 2 according to an exemplary embodiment.

For this example, each of the electrochromic materials prepared in Examples 1 and 2 were dissolved in an electrolyte solution of 0.2 M tetrabutyl ammonium hexafluorophosphate or LiClO$_4$ in γ-butyrolactone (GBL) to prepare an electrochromic solution. Spacers were disposed between a glass substrate coated with an ITO transparent electrode and an ITO glass substrate having a counter electrode to maintain a cell gap, and sealed to produce a test cell. The electrochromic solution was injected into the test cell to fabricate an electrochromic test device. For this example, (a) No voltage (0 V) was applied and (b) a voltage of 1.5 V was applied to test the electrochromic properties of the test devices. The results are shown in FIGS. 5 and 6. FIG. 5 demonstrates the electrochromic properties of the electrochromic materials prepared in Examples 1. FIG. 6 demonstrates the electrochromic properties of the electrochromic materials prepared in Examples 2. As can be seen in FIGS. 5 and 6, the test cells were substantially transparent yellow at 0 V and turned dark red at a voltage of 1.5 V.

Experimental Examples 3 and 4

For this example, 0.25 g of a powder of TiO$_2$ nanoparticles, 0.060 g of carbowax, 0.5 mL of terpineol and 0.5 mL of ethanol were mixed together to obtain a paste. The paste was patterned on an ITO transparent electrode to form a film. The film was sequentially annealed at 150° C. for one hour and then heated to 450° C. for 2 hours to form a TiO$_2$ nanocrystal layer.

Compounds having ethyl phosphoric acid as the linker structure of Formula 3 were prepared from the compounds of Examples 1 and 2. The linker structure was substituted at R$_3$ of the compounds of Formula 1 and 2. Each of the compounds were dissolved in acetonitrile. An ITO transparent electrode having the TiO$_2$ layer was dipped in the solution for 12 hours, removed from the solution, and dried.

Subsequently, spacers were disposed between an ITO transparent electrode, in which the electrochromic material was adsorbed on the TiO$_2$ layer, and an ITO glass substrate having antimony-doped tin oxide (ATO) as a counter electrode and a reflective film (average particle size: 150 nm) to maintain a cell gap. Thereafter, an electrolyte solution of 0.2 M tetrabutyl ammonium hexafluorophosphate or LiClO$_4$ in γ-butyrolactone (GBL) was injected and sealed to fabricate an electrochromic device.

The electrochromic properties of the electrochromic devices were tested in the same procedure as described in Experimental Examples 1 and 2. As a result, the electrochromic devices showed the same results as in Experimental Examples 1 and 2. In particular, the test cells were substantially transparent yellow at 0 V and turned dark red at a voltage of 1.5 V.

In addition, even when no voltage was applied after the discoloration, the electrochromic properties were maintained, that is, image memory properties were observed.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. While the present invention has been particularly shown and described with reference to exemplary embodiments thereof, it will be understood by those of ordi-

What is claimed is:

1. An electrochromic material represented by the compound of Formula 1:

(1)

wherein $R_1$, $R_2$ and $R_3$ are independently hydrogen, halogen, CN, $C_1$-$C_{12}$ alkyl, $C_1$-$C_{12}$ cycloalkyl, $C_1$-$C_{12}$ alkoxy, $C_5$-$C_{12}$ aryl, $C_5$-$C_{12}$ aryloxy, $C_5$-$C_{12}$ heteroaryl, silyl, dialkylboronyl or diarylboronyl, and X represents a counter ion.

2. The electrochromic material according to claim 1, wherein at least one of $R_1$, $R_2$ and $R_3$ is substituted with a group of the compound of Formula 3:

(3)

wherein -Z- is selected from the group consisting of —($CH_2$)$_n$—, wherein, n is an integer from 1 to 10, $C_4$-$C_{12}$ cycloalkyl, $C_4$-$C_{12}$ alkenyl, $C_5$-$C_{12}$ aryl, $C_5$-$C_{12}$ heteroaryl and $SiR_2$.

3. The electrochromic material according to claim 2, wherein n is 1 or 2.

4. The electrochromic material according to claim 1, wherein the compound of Formula 1 further comprises linking groups (-Z-) through which the carbazole groups are bonded to the viologen moiety, as represented by the compound of Formula 4:

(4)

wherein $R_1$, $R_2$ and $R_3$ are same as defined in Formula 1, and -Z- is selected from the group consisting of —($CH_2$)$_n$—, wherein n is an integer from 1 to 10, $C_4$-$C_{12}$ cycloalkyl, $C_4$-$C_{12}$ alkenyl, $C_5$-$C_{12}$ aryl, $C_5$-$C_{12}$ heteroaryl and $SiR_2$.

5. The electrochromic material according to claim 4, wherein n is 1 or 2.

6. The electrochromic material according to claim 1, wherein counter ion X is selected from the group consisting of halides, $PF_6^-$, $BF_4^-$ and $BH_4^-$.

7. The electrochromic material according to claim 1, wherein the compound of Formula 1 is represented by the compound of Formula 6:

(6)

8. An electrochromic material represented by the compound of Formula 2:

(2)

wherein $R_1$, $R_2$, $R_3$ and $R_4$ are independently hydrogen, halogen, CN, $C_1$-$C_{12}$ alkyl, $C_1$-$C_{12}$ cycloalkyl, $C_1$-$C_{12}$ alkoxy, $C_5$-$C_{12}$ aryl, $C_5$-$C_{12}$ aryloxy, $C_5$-$C_{12}$ heteroaryl, silyl, dialkylboronyl or diarylboronyl, and X represents a counter ion.

9. The electrochromic material according to claim 8, wherein at least one of $R_1$, $R_2$, $R_3$ and $R_4$ is substituted with a group of the compound of Formula 3:

(3)

wherein -Z- is selected from the group consisting of —($CH_2$)$_n$—, wherein n is an integer from 1 to 10, $C_4$-$C_{12}$ cycloalkyl, $C_4$-$C_{12}$ alkenyl, $C_5$-$C_{12}$ aryl, $C_5$-$C_{12}$ heteroaryl and $SiR_2$.

10. The electrochromic material according to claim 9, wherein n is 1 or 2.

11. The electrochromic material according to claim 8, wherein the compound of Formula 2 further contains linking groups (-Z-) through which the fluorene groups are bonded to the viologen moiety, as represented by the compound of Formula 5:

(5)

wherein $R_1$, $R_2$, $R_3$, $R_4$ and X are as defined in Formula 2, and each -Z- is selected from the group consisting of —$(CH_2)_n$— (n is an integer from 1 to 10), $C_4$-$C_{12}$ cycloalkyl, $C_4$-$C_{12}$ alkenyl, $C_5$-$C_{12}$ aryl, $C_5$-$C_{12}$ heteroaryl and $SiR_2$.

12. The electrochromic material according to claim 8, wherein the counter ion X is selected from the group consisting of halides, $PF_6^-$, $BF_4^-$ and $BH_4^-$.

13. The electrochromic material according to claim 8, wherein the compound of Formula 2 is represented by the compound of Formula 7:

(7)

14. An electrochromic device comprising the electrochromic material according to claim 1.

15. The electrochromic device according to claim 14, wherein the electrochromic material is supported on nanostructures to form an electrochromic layer.

16. An electrochromic device comprising the electrochromic material according to claim 8.

17. The electrochromic device according to claim 16, wherein the electrochromic material is supported on nanostructures to form an electrochromic layer.

18. The electrochromic material according to claim 11, wherein n is 1 or 2.

* * * * *